(12) United States Patent
Aotani (10) Patent No.: US 10,033,047 B2
(45) Date of Patent: Jul. 24, 2018

(54) METAL GAS DIFFUSION LAYER FOR FUEL CELLS, AND METHOD FOR MANUFACTURING THE SAME

(71) Applicant: Nissan Motor Co., Ltd., Yokohama-shi, Kanagawa (JP)

(72) Inventor: Koichiro Aotani, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 110 days.

(21) Appl. No.: 14/899,618

(22) PCT Filed: May 22, 2014

(86) PCT No.: PCT/JP2014/063607
§ 371 (c)(1),
(2) Date: Dec. 18, 2015

(87) PCT Pub. No.: WO2015/001862
PCT Pub. Date: Jan. 8, 2015

(65) Prior Publication Data
US 2016/0149227 A1  May 26, 2016

(30) Foreign Application Priority Data
Jul. 5, 2013 (JP) .................................. 2013-141687

(51) Int. Cl.
*H01M 8/10* (2016.01)
*H01M 4/88* (2006.01)
(Continued)

(52) U.S. Cl.
CPC .......... *H01M 4/8807* (2013.01); *B32B 15/01* (2013.01); *H01M 4/8605* (2013.01);
(Continued)

(58) Field of Classification Search
CPC ............. H01M 4/8807; H01M 4/8605; H01M 4/8663; H01M 4/8882; H01M 4/8892;
(Continued)

(56) References Cited

U.S. PATENT DOCUMENTS

| | | | |
|---|---|---|---|
| 5,441,823 A | 8/1995 | Naimer et al. | |
| 2011/0039164 A1* | 2/2011 | Akers | H01M 4/86 429/401 |

FOREIGN PATENT DOCUMENTS

| | | |
|---|---|---|
| EP | 0 357 077 A2 | 3/1990 |
| JP | 52-22732 A | 2/1977 |

(Continued)

OTHER PUBLICATIONS

Nagoshi et al., JP 2005-302610, Fuel Cell, and Manufacturing Method for Metal Diffusion Layers Therefor, Publish Oct. 27, 2005.*

*Primary Examiner* — Jimmy Vo
(74) *Attorney, Agent, or Firm* — Global IP Counselors, LLP (57) ABSTRACT

A method for manufacturing a metal gas diffusion layer made of a metal porous body, the method includes forming a conductive layer of carbon film layer on the metal porous body, and forming a water-repellent layer on the metal porous body formed with the conductive layer. The forming a water-repellent layer includes coating a solution containing a fluorine resin which constitutes the water-repellent layer and a volatile component which does not constitute the water-repellent layer on the metal porous body, and heat-treating the metal porous body coated with the solution at or above a temperature at which a component which contains the volatile component and which does not constitute the water-repellent layer contained in the solution and less than a temperature at which an electrical resistance of the con- (Continued)

ductive layer is increased and electron conductivity is deteriorated to thereby form the water-repellent layer composed of the fluorine resin.

13 Claims, 11 Drawing Sheets (51) Int. Cl.
| | |
|---|---|
| H01M 4/86 | (2006.01) |
| H01M 8/0232 | (2016.01) |
| H01M 8/0239 | (2016.01) |
| H01M 8/0245 | (2016.01) |
| H01M 8/0234 | (2016.01) |
| B32B 15/01 | (2006.01) |
| H01M 8/1018 | (2016.01) |

(52) U.S. Cl.
CPC ....... *H01M 4/8663* (2013.01); *H01M 4/8882* (2013.01); *H01M 4/8892* (2013.01); *H01M 8/0232* (2013.01); *H01M 8/0234* (2013.01); *H01M 8/0239* (2013.01); *H01M 8/0245* (2013.01); *H01M 2008/1095* (2013.01); *Y02P 70/56* (2015.11)

(58) Field of Classification Search
CPC ............. H01M 8/0232; H01M 8/0234; H01M 8/0239; H01M 8/0245
See application file for complete search history.

(56) References Cited

FOREIGN PATENT DOCUMENTS

| | | |
|---|---|---|
| JP | 6-5289 A | 1/1994 |
| JP | 2000-58072 A | 2/2000 |
| JP | 2005-302610 A | 10/2005 |
| JP | 2006-59661 A | 3/2006 |
| JP | 2008-243513 A | 10/2008 |
| JP | 2010129393 A * | 6/2010 |

* cited by examiner

METAL GAS DIFFUSION LAYER FOR FUEL CELLS, AND METHOD FOR MANUFACTURING THE SAME

CROSS-REFERENCE TO RELATED APPLICATIONS

This application is a U.S. National stage application of International Application No. PCT/JP2014/063607, filed May 22, 2014, which claims priority to Japanese Patent Application No. 2013-141687 filed in Japan on Jul. 5, 2013, the contents of each of which are herein incorporated by reference.

BACKGROUND

Field of the Invention

The present invention relates to a metal gas diffusion layer for a fuel cell and a method for manufacturing the same.

Background Information

As a gas diffusion layer for a fuel cell, a metallic porous body formed with a conductive layer for improving electron conductivity and a water repellent layer for imparting water repellency has been proposed (e.g. see JP 2005-302610 JP).

SUMMARY

However, the conductive layer is made of precious metal such as gold, platinum and the like, it is difficult to achieve cost reduction is difficult. Meanwhile, it is necessary to form the water-repellent layer after formation of the conductive layer to be followed by a high-temperature heat treatment. Here, when applying a carbon coating layer of a low cost as the conductive layer, the carbon coating layer may destroyed by the high temperature heat treatment for forming a water-repellent layer to thereby cause a problem in that the electron conductivity is lowered.

The present invention has been made in order to solve the problems associated with the conventional technique, and aims to provide a fuel cell metal gas diffusion layer of good electronic conductivity and water-repellency at low-cost as well as a method for manufacturing the same.

In one aspect of the present invention for achieving the above object, a method for manufacturing a metal gas diffusion layer is proposed, which is made of a metal porous body disposed between a polymer electrolyte membrane and a separator. The method comprises a step (A) in which a conductive layer of carbon film layer is formed on the metal porous body, and a step (B) in which the water-repellent layer is formed on the metal porous body formed with the conductive layer. The step (B) further includes a coating step (B1) in which a solution containing a fluorine resin which constitutes the water-repellent layer (B1) and a volatile component which will not constitute the water-repellent layer are coated, and the water-repellent forming step (B2) in which the metal porous body coated with the solution is heat-treated at or above a temperature at which a component which contains the volatile component and which would not constitute the water-repellent layer contained in the solution and less than a temperature at which the electrical resistance of the conductive layer is increased and the electron conductivity is deteriorated to thereby form the water-repellent layer composed of the fluorine resin.

In another aspect of the present invention for achieving the above object, a metal gas diffusion layer for a fuel cell is provided, which is manufactured according to the manufacturing method of a metal gas diffusion layer for a fuel cell described above.

According to the present invention, since the conductive layer includes a carbon coating layer, as compared to the conductive layer made of precious metal such as gold, platinum and the like, it is possible to form the same inexpensively. In addition, since the heat treatment temperature is less than a temperature at which the electrical resistance of the conductive layer is increased and the electron conductivity is deteriorated, the destruction of the conductive layer can be suppressed when forming the water-repellent layer. In other words, while maintaining good electron conductivity imparted by forming a conductive layer, it is possible to impart good water repellency. Therefore, it is possible to provide a metal gas diffusion layer for a fuel cell with good electron conductivity and water-repellency at low cost, and to provide a manufacturing method thereof.

Other objects, features and characteristics of the present invention will be apparent by referring to the preferred embodiments illustrated in the following description and the accompanying drawings.

BRIEF DESCRIPTION OF THE DRAWINGS

Referring now to the attached drawings which form a part of this original disclosure.

DETAILED DESCRIPTION OF THE EMBODIMENTS

Hereinafter, embodiments of the present invention will be described with reference to the drawings.

Figure 1:
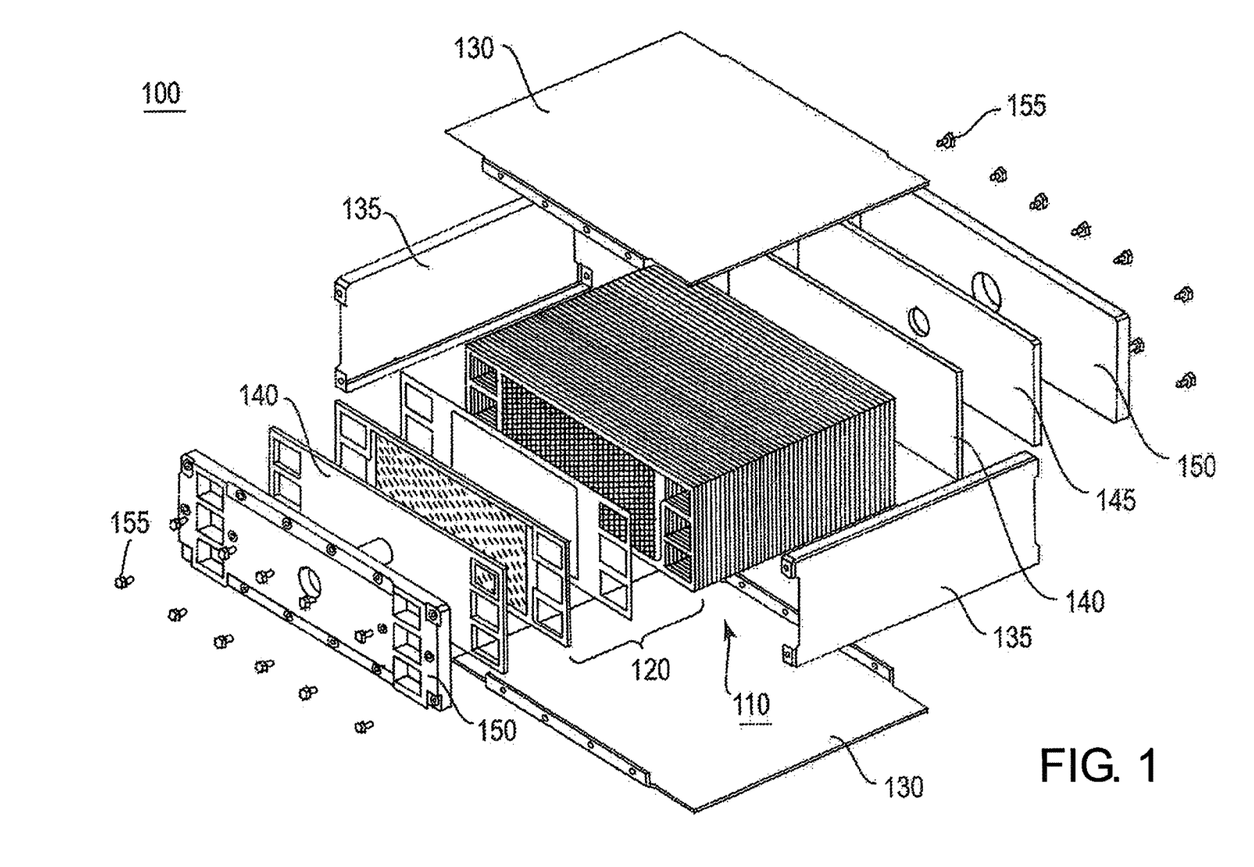
FIG. 1 is an exploded perspective view for explaining a fuel cell according to an embodiment according to the present invention.

FIG. 1 is an exploded perspective view for explaining a fuel cell according to an embodiment of the present invention.

The fuel cell 100 according to the first embodiment is composed of, for example, a polymer electrolyte fuel cell using hydrogen as fuel and is utilized as a power source. For the polymer electrolyte fuel cell (PEFC), downsizing, densification, and an increased power are possible. It is preferably applied as a power supply for driving mobile objects such as a vehicle having a limited mounting space, particularly applied preferably to automobiles in which the system frequently starts and stops, or the output frequently changes. In this case (fuel-cell automobile), the PEFC can be mounted under the seats at the center of the car body, in the lower part of the rear trunk room, and in the engine room in the vehicle front portion in the automobile, for example. It is preferably mounted under the seats from a viewpoint that a large interior space and trunk room are secured within the car.

As shown in FIG. 1, the fuel cell 100 has a stack part 110, fastener plates 130, reinforcing plates 135, current collectors 140, a spacer 145, end plates 150, and bolts 155.

The stack part 110 includes a stack body of single cells 120. The single cell 120 has a membrane electrode assembly (MEA), and separators, as describe below.

The fastener plates 130 are disposed respectively on a bottom surface and an upper surface of the stack part 110, and the reinforcing plates 135 are disposed on both sides of the stack part 110. That is to say, the fastener plates 130 and the reinforcing plates 135 jointly constitute a casing surrounding the stack part 110.

The current collectors 140 are formed from conductive members with gas impermeability, such as a dense carbon and a copper plate. They include an output terminal for outputting an electromotive force generated in the stack part 110, and are disposed at both ends of the stack of the single cells 120 in the stacking direction (at the front and the back of the stack part 110).

The spacer 145 is disposed outside of the current collector plate 140 disposed on the rear surface of the stack 110.

The end plates 150 are made of a material with rigidity, for example, a metallic material such as steel, and disposed outside the current collector plate 140 disposed at the front of the stack part 110 and outside the spacer 145. The end plates 150 have a fuel gas inlet, a fuel gas outlet, an oxidant gas inlet, an oxidant gas outlet, a cooling water inlet, and a cooling water outlet in order to supply or discharge fuel gas (hydrogen), oxidant gas (oxygen), and a coolant (cooling water) to circulate through the stack part 110.

The bolts 155 are used to hold the internally located stack part 110 in a pressed state by fastening the end plates 150, the fastener plates 130, and the reinforcing plates 135 together to thereby exert a fastening force in the stacking direction of the single cells 120. The number of bolts 155 and the positions of bolt holes can be appropriately changed. In addition, the fastening mechanism is not limited to threaded fasteners, and other means are also applicable.

Figure 2:
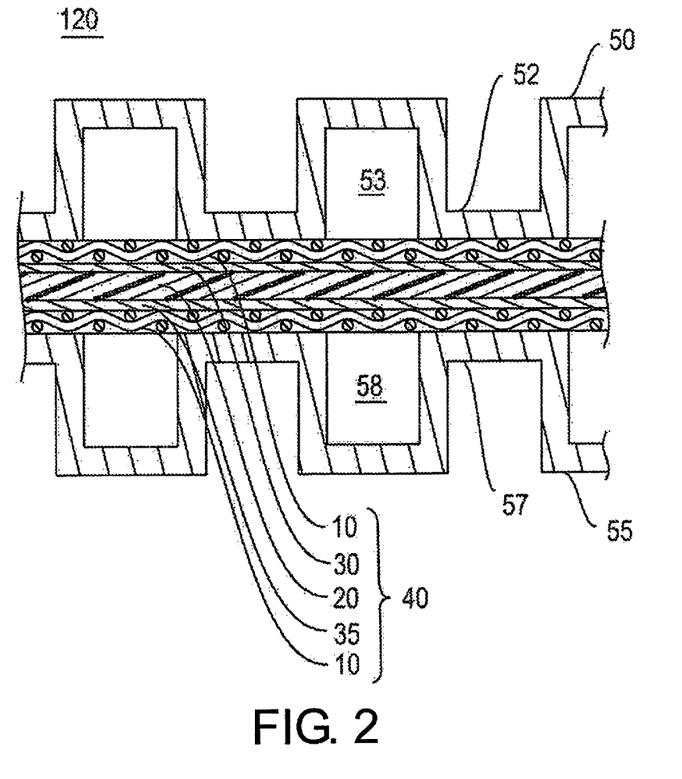
FIG. 2 is a sectional view for explaining a unit cell shown in FIG. 1.
Figure 3:
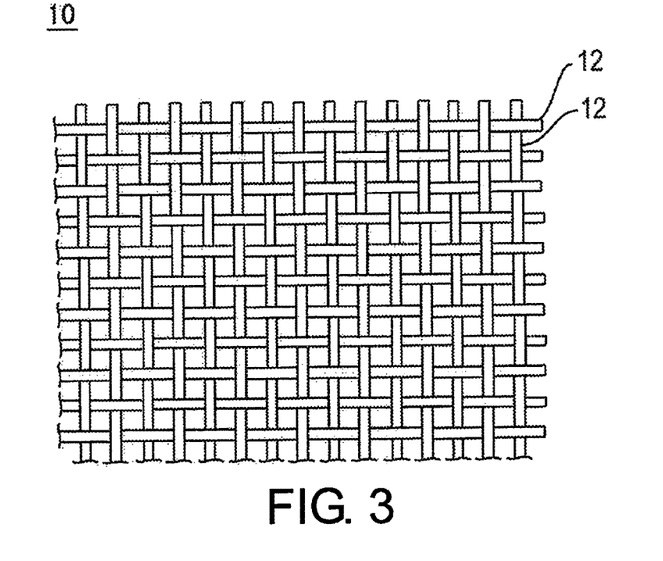
FIG. 3 is a plan view for explaining a metal gas diffusion layer shown in FIG. 2.

FIG. 2 is a cross-sectional view for describing a unit cell illustrated in FIG. 1. FIG. 3 is a plan view for describing the metal gas diffusion layer illustrated in FIG. 2.

Each single cell 120 has a membrane electrode assembly 40, and separators 50 and 55. The membrane electrode assembly 40 has a polymer electrolyte membrane 20, a catalyst layer 30 which functions as an electrode (cathode), a catalyst layer 35 which functions as an electrode (anode), and a gas diffusion layer 10.

As shown in FIG. 3, the metal gas diffusion layer 10 is formed in a porous metal body, and, as described below, possesses good electron conductivity and water repellency at a low cost. In the present embodiment, the metal-made gas diffusion layer 10 is made of wire mesh formed by weaving a plurality of metallic wires 12. In order to incorporate good strength, it is easy to form a thin gas diffusion layer. Weaving of the wires 12 (knitting) is not particularly limited. For example, a plain weave, twill, plain-tatami or Dutch weave, and twilled tatami-weave are also applicable. In addition, the wire mesh may be formed by fixing fires together (thorough welding, for example) without weaving.

The metal gas diffusion layer 10 is respectively disposed between the separator 50 and the catalyst layer 30, and between the separator 55 and the catalyst layer 35 for supplying gas to the catalyst layers 30, 35. The metal gas diffusion layer 10 disposed between the separator 50 and the catalyst layer 30 is intended for an anode gas diffusion layer for distributing a fuel gas to be supplied to the anode side, while the metal gas diffusion layer 10 disposed between the separator 55 and the catalyst layer 35 is intended for a cathode gas diffusion layer for dispersing the oxidant gas supplied to the cathode side. The mesh of the metal gas diffusion layer 10 is sized preferably above 100 in view of the gas feeding ability and cell voltage, and is more preferably sized within a range between 100 and 500.

The catalyst layer 30 includes a catalytic component, a conductive catalyst carrier for carrying the catalytic component, and a polymer electrolyte. The catalyst layer 30 is an anode catalyst layer in which the hydrogen oxidation reaction proceeds, and is disposed on one side of the polymer electrolyte membrane 20. The catalyst layer 35 includes a catalytic component, a conductive catalyst carrier for carrying the catalytic component, and a polymer electrolyte. The catalyst layer 35 is a cathode catalyst layer in which the oxygen reduction reaction proceeds, and is disposed on the other side of the polymer electrolyte membrane 20.

The polymer electrolyte membrane 20 has a function to allow protons generated in the catalyst layer (anode catalyst layer) 30 to selectively permeate into the cathode catalyst layer 35, and a function as a partition wall to prevent mixture of the fuel gas supplied to the anode side and the oxidant gas supplied to the cathode side.

The separators 50 and 55 have a function to electrically connect the single cells in series and a function as a partition wall to separate the fuel gas, the oxidant gas, and the coolant from one another. Note that the separators 50 and 55 have substantially the same shape as the membrane electrode assembly 40 and are formed by pressing a stainless steel plate, for example. The stainless steel plate is preferable in terms of ease of complex machining and good conductivity. It is also possible, if necessary, to apply a corrosion-resistant coating.

The separator 50 is an anode separator disposed on the anode side of the membrane electrode assembly 40, and faces the catalyst layer 30. The separator 50 includes a rib portion 52 constituting a gas passage or channel 53 disposed between the membrane electrode assembly 40 and the separator 50 and manifold holes (not shown) disposed respectively for circulating hydrogen, oxygen, and coolant. The separator 45 is a cathode separator disposed on the cathode side of the membrane electrode assembly 30, and is facing opposite to the catalyst layer 36. The separators 40 and 45 have multiple manifolds for circulating the fuel gas, the oxidant gas, and the coolant. The gas channel 53 is utilized for supplying the fuel gas to the catalyst layer 30.

The separator 55 is a cathode separator that is disposed on the cathode side of the membrane electrode assembly 40, and is positioned relative to the catalyst layer 35. The separator 55 further includes a rib portion 57 constituting a gas flow channel 58 between the membrane electrode assembly 40 and the separator 55 and manifold holes (not shown) provided for circulation of hydrogen, oxygen, and coolant, respectively. The gas channel 58 is used to supply the oxidant gas to the catalyst layer 35.

Now, a description is given in detail of the polymer electrolyte membrane 20, the catalyst layer 30, 35 and the separator 50, 55 with respect to the materials and the other properties.

For the polymer electrolyte membrane 20, a fluorine polymer electrolyte membrane made of perfluorocarbon sulfonic acid polymer, a hydrocarbon resin film having a sulfonic acid group, and a porous membrane impregnated with an electrolyte component such as phosphoric acid and ionic liquid can be applied. Examples of the perfluorocarbon sulfonic acid polymer include Nafion (registered trademark, produced by E. I. du Pont de Nemours and Company), Aciplex (registered trademark, produced by Asahi Kasei Corporation), Flemion (registered trademark, produced by ASAHI GLASS CO., LTD.), and Gore select series (registered trademark, Japan Gore Co., Ltd.). The porous membrane is formed from polytetrafluoroethylene (PTFE) and polyvinylidene fluoride (PVDF).

Although the thickness of the polymer electrolyte membrane 20 is not particularly limited, the thickness is preferably within a range between 5 and 300 μm, more preferably between 10 and 200 μm, in view of the strength, the durability, and the output characteristics.

The catalytic component used in the anode catalyst layer 30 is not particularly limited as long as having catalytic effect on the oxidation reaction of hydrogen. Further, the catalytic component used in the cathode catalyst layer 35 is not particularly limited as long as having catalysis on the oxygen reduction reaction.

The catalytic component is specifically selected from, for example, metals such as platinum, ruthenium, iridium, rhodium, palladium, osmium, tungsten, lead, iron, chromium, cobalt, nickel, manganese, vanadium, molybdenum, gallium, and aluminum, their alloys, and others. The catalytic component preferably includes at least platinum in order to improve the catalytic activity, the poisoning resistance to carbon monoxide, the thermal resistance, and others. The catalytic component applied to the cathode catalyst layer and the catalytic component applied to the anode catalyst layer are not necessarily the same, and can be appropriately selected. Note that it is also possible to apply a catalyst containing no precious metals.

A conductive carrier for a catalyst used in the catalyst layers 30 and 35 is not particularly limited as long as having a specific surface area to carry the catalytic component in a desired dispersed state and sufficient electron conductivity as a current collector. However, the conductive carrier is preferably composed mainly of carbon particles. The carbon particles include, for example, carbon black, activated carbon, corks, natural graphite, and artificial graphite.

The polymer electrolyte used in the catalyst layers 30 and 35 is not particularly limited as long as being a member having at least high proton conductivity. For example, a fluorine electrolyte with fluorine atoms in all or a part of polymer backbones and a hydrocarbon electrolyte without fluorine atoms in polymer backbones are applicable. The polymer electrolyte used in the catalyst layers 30 and 35 may be the same as or different from that used in the polymer electrolyte membrane 20. They are preferably the same in view of improved adhesion of the catalyst layers 30 and 35 to the polymer electrolyte membrane 20.

The separators 50 and 55 are not limited to the form made of stainless steel plates. Metal materials (for example, an aluminum plate and a clad material) other than a stainless steel plate, and carbon such as a dense carbon graphite and a carbon plate, are also applicable.

Now, a description is given of a method of manufacturing the metal gas diffusion layer 10.

Figure 4:
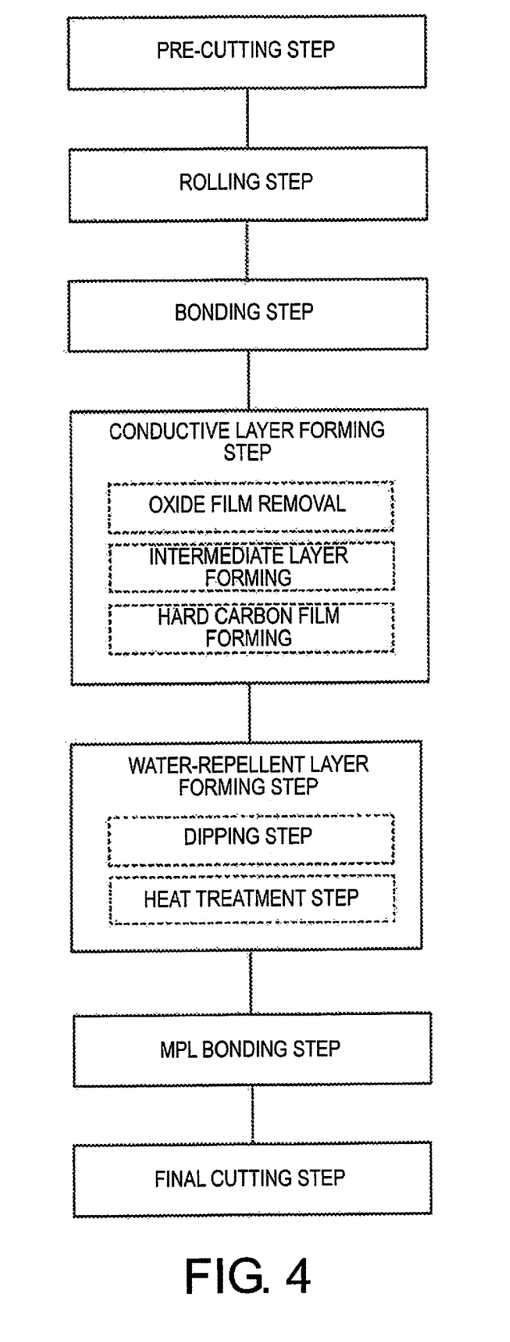
FIG. 4 is a flowchart for explaining a manufacturing method of a metal gas diffusion layer pertaining to the embodiment of the present invention.

FIG. 4 is a flowchart for explaining a method of manufacturing a metal gas diffusion layer pertaining to the embodiment of the present invention.

The method for manufacturing a metal gas diffusion layer 10 has steps including a pre-cutting step, a rolling step, a bonding step, a conductive layer forming step, a water-repellent layer forming step, a MPC bonding step, and a final cutting step.

In the pre-cutting step, a wide coil stock or material which is configured by being wound in a cylindrical shape is subject to cutting to prepare a coil material of wire mesh material 10A with a predetermined width.

In the rolling step, by rolling the wire mesh material 10A to reduce the unevenness of the surface of the wire mesh material 10A, a region which is in contact with the power generation region (active area) is smoothened, and the contact area of wires constituting the wire mesh material 10A will be increased.

In the bonding step, for example, the wire-to-wire bonding is carried out by diffusion bonding. The diffusion bonding is a bonding method in which the diffusion of atoms occurring in the bonding surface is utilized so that the fray prevention and corrosion resistance of the wire material constituting the wire mesh material 10A is achieved. Note that, since the contact area between the wires is increased in the rolling step, good bonding strength is obtained.

In the conductive layer forming step, a conductive layer made of a carbon coating layer is formed on the wire mesh material 10A. Thus, while improving electron conductivity, corrosion can be suppressed and prevented to improve the durability. In addition, since the conductive layer consists of a carbon coating layer, as compared to the conductive layer made of precious metal such as gold or platinum, it is possible to manufacture the conductive layer inexpensively.

In the water-repellent layer forming step, a water repellent agent is coated on the wire mesh material 10A to form a water-repellent layer. This ensures to reduce retention of water in the mesh portion of the metal-made gas diffusion layer 10 which is produced, and blocking or flooding of the gas supply due to water is suppressed. Thus, a stable supply of gas to the catalyst layers 30, 35 is ensured, and, by suppressing a sudden drop in the cell voltage, it is possible to stabilize the cell voltage. In this case, as described below, while suppressing breakage or rupture of the conductive layer, the water-repellent layer is formed. That is, in the water-repellent layer forming step, while maintaining good electron conductivity imparted by forming a conductive layer, it is possible to impart good water repellency.

In the MPL bonding step, in order to further improve water repellency, microporous layer (MPL) is joined to the wire mesh material 10A. The microporous layer is a carbon particle layer formed of an aggregate of carbon particles containing a water repellent agent. The carbon particles contained in the microporous layer is not particularly limited, and, for example, may be composed of a carbon black, graphite or expanded graphite. The carbon black refers to oil furnace black, channel black, lamp black, thermal black, acetylene black, and the like are preferred because of excellency in electron conductivity and large specific surface. As the water-repellent agent contained in the micro porous layer, the same material as the aforementioned water repellent agent may be used. The fluorine-based polymer material is excellent in water repellency as well as in corrosion resistance during electrode reaction.

In the final cutting step, for example, the wire mesh material 10A is cut by a shear step to thereby obtain a metal gas diffusion layer 10 having a predetermined shape. The metal gas diffusion layer 10 which is thus produced is disposed between the catalyst layer 30, 35 and the separators 50, 55 of the membrane electrode assembly 40, to constitute a fuel cell 100.

Figure 5:
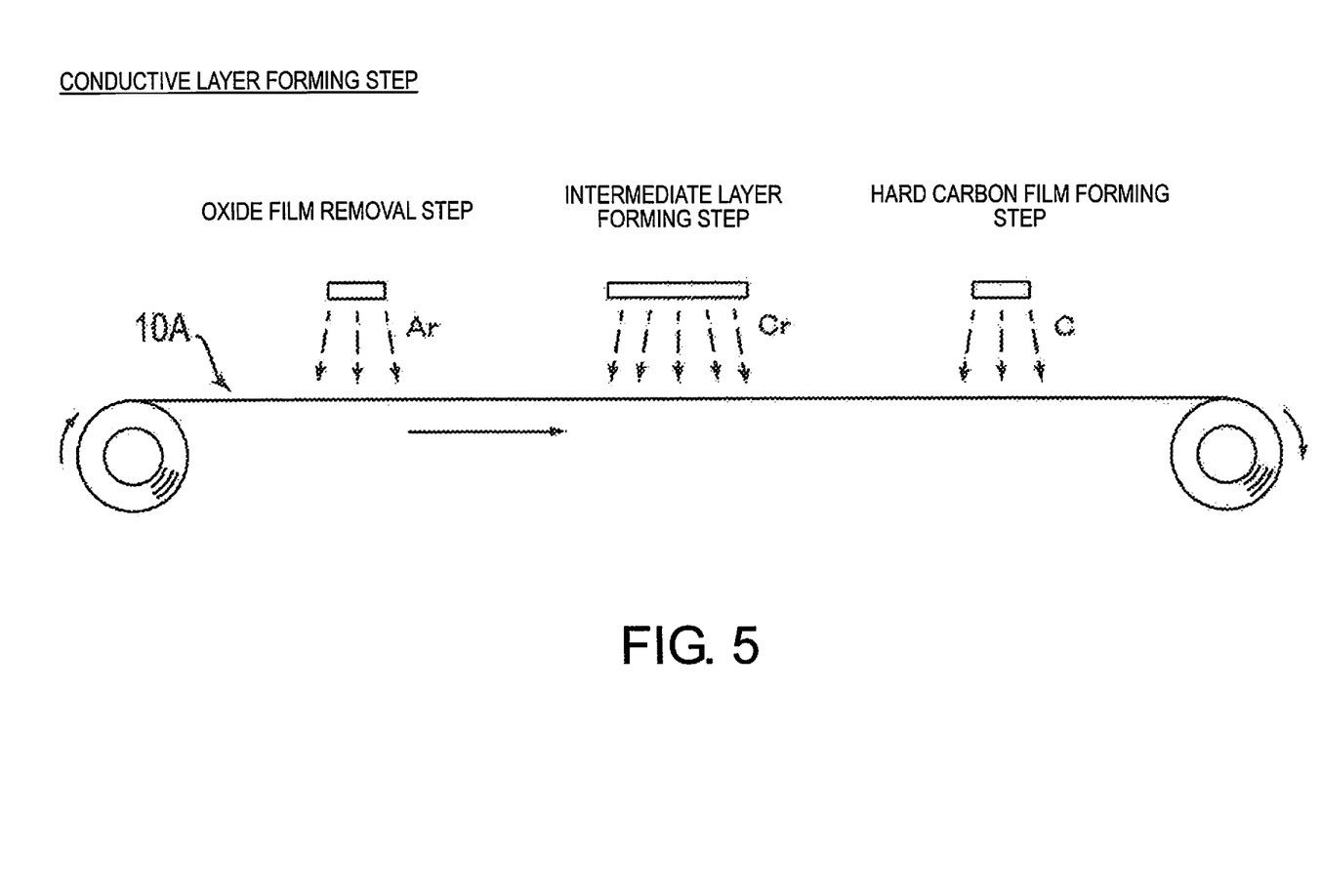
FIG. 5 is a schematic view for explaining a conductive layer forming step shown in FIG. 4.

Now, a description in detail is made of the conductive layer forming step.

FIG. 5 is a schematic view for explaining a conductive layer forming step shown in FIG. 4.

As shown in FIG. 5, the conductive layer forming step includes an oxide film removal step, an intermediate layer forming step, and a hard carbon film forming step. If necessary, the surface of the wire mesh material 10A to be introduced in the conductive layer forming step may be subject to pre-degrease and cleaning using a suitable solvent, if necessary. The solvent may be ethanol, ether, acetone, isopropyl alcohol, trichlorethylene, and the like. Dirt removed from the surface of the wire mesh material 10A is, for example, a residue of the applied lubricant during knitting the wire constituting the wire mesh material 10A.

In the oxide film removal step, by ion bombardment treatment, for example, the oxide film is removed which is formed on the surface of the wire mesh material 10A. The ion bombardment treatment refers to a plasma treatment in which the Ar (argon) gas is ionized by high-frequency plasma to collide with the surface of the wire mesh material 10A.

In the intermediate layer forming step, by a sputtering process, for example, an intermediate layer is formed on the surface of the wire mesh material 10A. The intermediate layer may be composed of, for example, chromium (Cr) and functions to improve the adhesion between the wire mesh material 10A and a hard carbon film. Further the intermediate layer has a function to prevent elution of ions from the wire mesh material 10A.

In the hard carbon film forming step, by sputtering, for example, to laminate a layer containing carbon on an atomic level in the surface of the intermediate layer to form a hard carbon coating layer. The hard carbon coating layer is a conductive layer composed of a diamond-like carbon (DLC Diamond-Like Carbon). Thus, in the interface between the hard carbon coating layer, the intermediate layer, and the wire mesh 10A and its vicinity, a long period of time of adhesiveness is ensured due to intermolecular force and entry of carbon atoms by little amount.

Incidentally, in the hard carbon coating layer made of diamond-like carbon, in order to ensure good electronic conductivity in the stacking direction, it is preferable to have an intensity ratio $R(I_D/I_G)$, which represents a ratio of the D-band peak intensity $I_D$ to the G-band peak intensity $I_G$ measured by the Raman scattering spectroscopy at or above 1.3, and more preferably at and above 2.0.

For example, by analyzing the carbon material by Raman spectroscopy, Raman peaks are generated usually in the vicinity of 1350 cm$^{-1}$ and 1584 cm$^{-1}$. Highly crystalline graphite, has a single peak in the vicinity of 1584 cm$^{-1}$, and this peak is usually referred to as the G-band. On the other hand, as the crystallinity is lower (i.e., as crystal structure defects increase), a peak emerges in the vicinity of 1350 cm$^{-1}$. This peak is commonly referred to as the D-band. Therefore, the intensity ratio of $R(I_D/I_G)$ representing the ratio of D-band peak intensity $I_D$ to G-band peak intensity $I_G$ may serve as an indicator of the disturbed condition of the graphite cluster size and graphite structure of the carbon material (crystal structure defectiveness). Note that the peak of the diamond is strictly at 1333 cm$^{-1}$, and is distinguished from the D-band described above.

On the other hand, polycrystalline graphite is microscopically of graphite crystal structure (graphite cluster) of anisotropic nature in which a graphene surface (hexagonal network surface) is layered. However, macroscopically, the polycrystalline graphite may be considered as isotropic crystal aggregated with a number of graphite structures. Thus, it is possible to say that it is a type of diamond-like carbon.

Therefore, in the hard carbon film forming step, by controlling the process so that the intensity ratio $R (=I_D/I_G)$ in the hard carbon coating layer made of diamond-like carbon, it is possible to ensure good electron conductivity.

Figure 6:
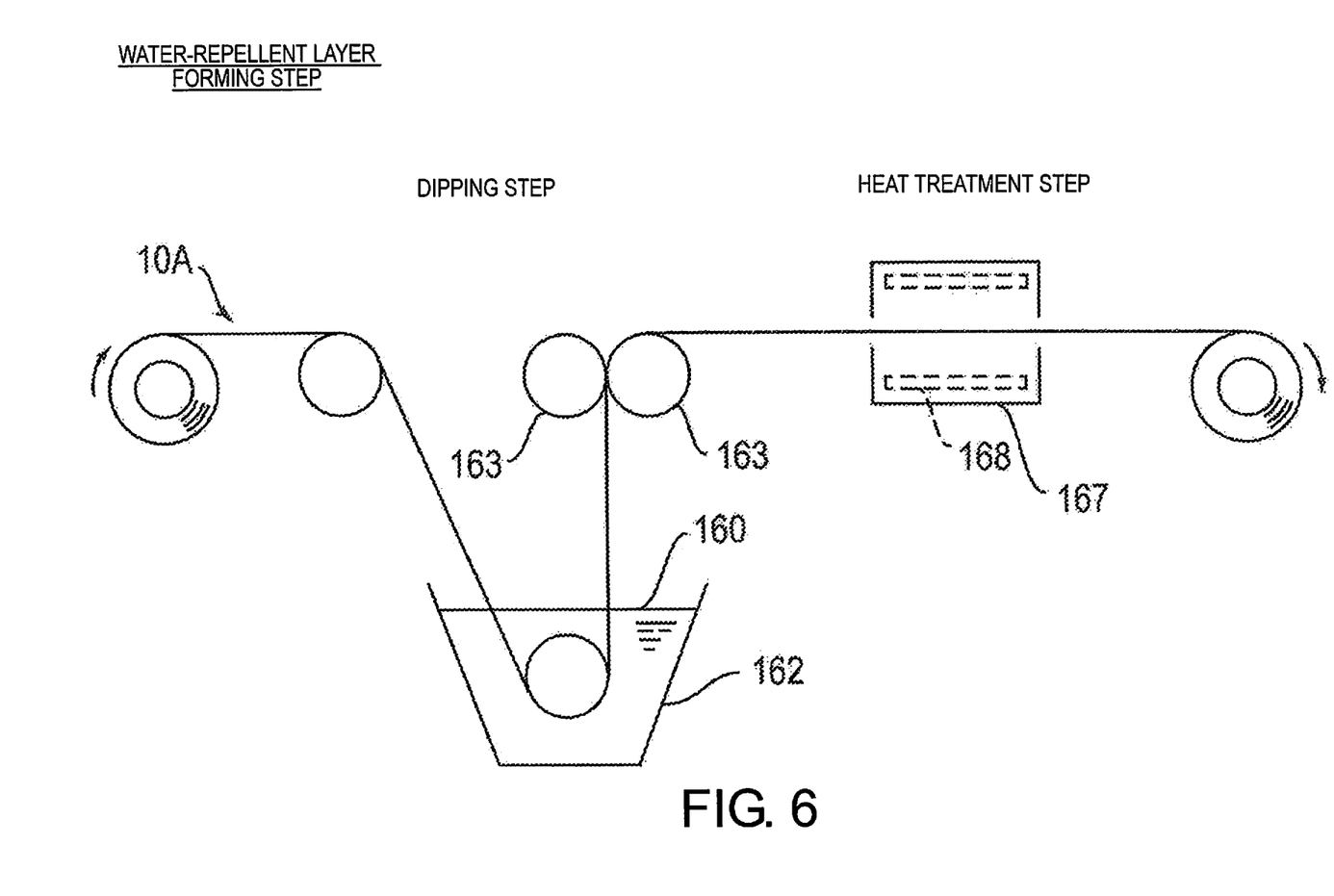
FIG. 6 is a schematic view for explaining a water-repellent layer forming step shown in FIG. 4.

Now, a description is given in detail of the water-repellent layer forming step.

FIG. 6 is a schematic diagram for explaining a water-repellent layer forming step shown in FIG. 4.

As shown in FIG. 6, the water-repellent layer forming step includes a dipping or immersion step and a heat treatment step.

In the dipping step, the wire mesh material 10A is dipped or immersed in a solution 160 contained in a tank 162, and, after being removed, passes between a pair of rollers 163.

The solution 160 is a water dispersion liquid that is mixed with a water repellent agent constituting the water-repellent layer, a surface active agent, and water. With the wire mesh material 10A is dipped and subsequently taken out, the solution 160 is coated (painted) with the solution (water repellent agent). The roller 163 is formed by a water absorbent roller formed in its surface with large number of fine pores. While the wire mesh material 10A passes, a liquid removal is performed in which the solution 160 excessively adhered will be removed from the wire mesh material 10A. The dip coating is preferable because of its simple configuration and process.

The water repellent agent is a fluorine resin such as PTFE, PVDF, poly hexafluoropropylene, tetrafluoroethylene-hexafluoropropylene copolymer (FEP), and the like. The FEP is preferable because it has a relatively low melting point as the fluorine resin, so that a relatively low temperature is applicable in the heat treatment in the subsequent heat treatment step. Note that the solution 160 is represented by a fluorine resin solution below.

The surface active agent or surfactant is added for a fluorine resin to be dispersed in water, whereby, as compared to a case where the fluorine resin is dispersed in an organic solvent, it is possible to reduce the environmental load related cost. Water is a volatile component contained in the fluorine resin solution 160, which would not constitute the water-repellent layer, while the surfactant represents a thermal decomposition component contained in the fluorine resin solution 160 and not constituting the water-repellent layer.

As the surfactants, anionic surfactants, nonionic surfactants, amphoteric surfactants, and cationic surfactants can be suitably applied. Anionic surfactants are, for example, higher alcohol sulfuric acid ester sodium salt, sodium alkylbenzene sulfonate, sodium salt of dialkyl succinate sulfonic acid, sodium salt of alkyl diphenyl ether sulfonic acids. The nonionic surfactants are polyoxyethylene alkyl ethers, polyoxyethylene alkyl aryl ether, and the like. The amphoteric surfactant is lauryl betaine, and the like. The cationic surfactants are alkyl pyridinium chloride, alkyl ammonium chloride, and the like.

In the heat treatment step, the wire mesh material 10A is introduced into a heat treatment furnace 167 and is heated by a heater 168 for heat treatment. The heat treatment temperature is set at or above the thermal decomposition temperature of the surfactant and below the destruction temperature of the conductive layer (hard carbon film layer), at which the electric resistance is increased and the electron conductivity is deteriorated. Thus, the water and surfactant in the fluorocarbon resin solution 160 which is coated on the wire mesh material 10A are removed. Further, the water-repellent layer is formed by the fluorocarbon resin (water repellent) which represents a non-volatile components remaining therein. The heater 168 is an infrared heater, for example.

As described above, in the water-repellent layer forming step, since the heat treatment temperature is less than the destruction temperature of the conductive layer made of a carbon film layer, destruction of the conductive layer made of a carbon film layer is suppressed when forming the water-repellent layer. In other words, while maintaining good electron conductivity imparted by forming a conductive layer made of a carbon film layer, by forming the water-repellent layer, it is possible to impart good water repellency. Therefore, it is possible to provide a manufacturing method for a fuel cell metal gas diffusion layer of good electronic conductivity and water-repellency at low cost.

Incidentally, coating of a fluorine resin solution 160 (water repellent) is not limited to the embodiment that utilizes the immersion or dip coating. Also, if required, by dispersing fluorine resin in an organic solvent, it is also possible to omit the addition of a surfactant.

Figure 7:
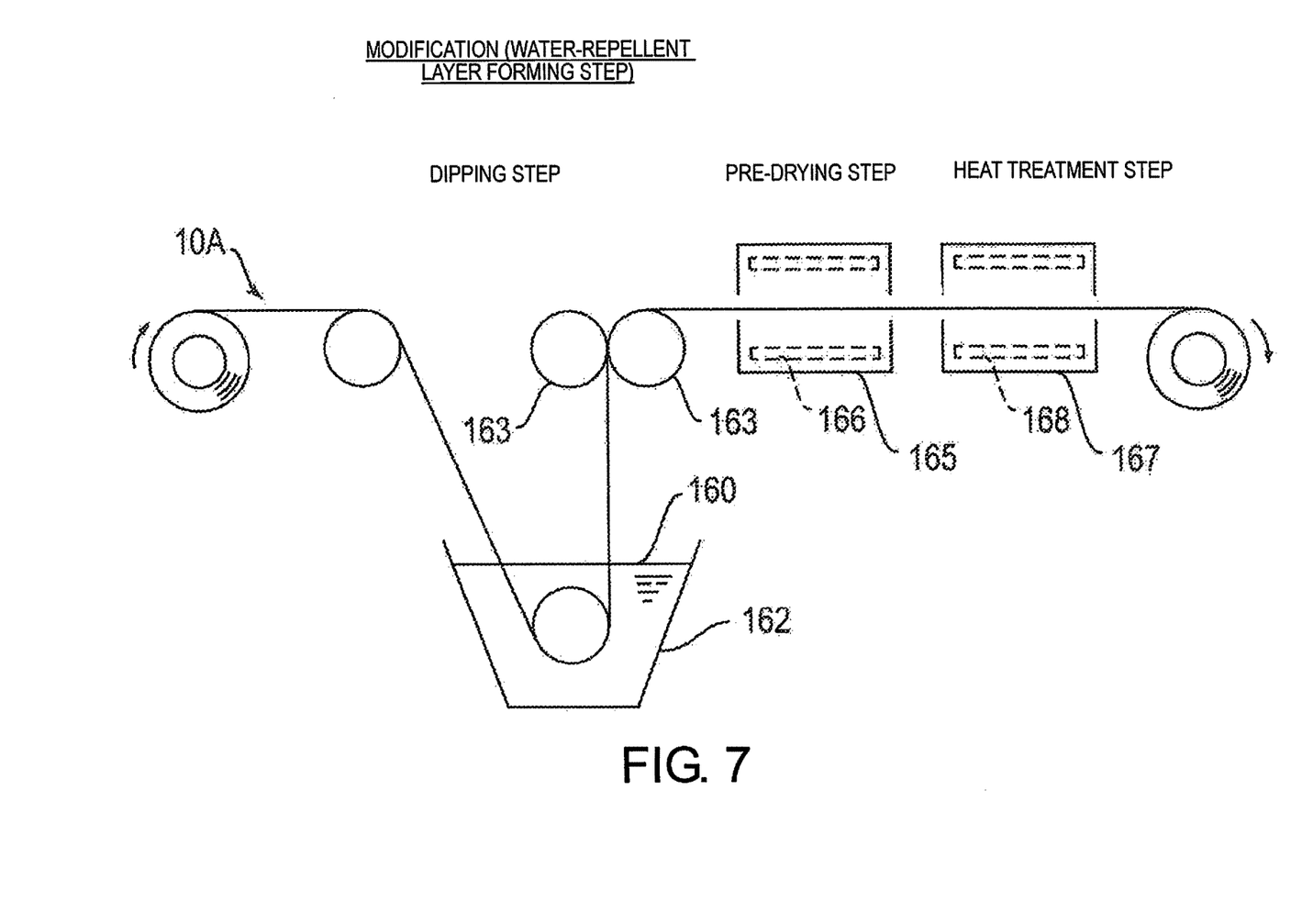
FIG. 7 is a schematic diagram for explaining a modification pertaining to the embodiment according to the present invention.

FIG. 7 is a schematic diagram for explaining a modification of the embodiment according to the present invention.

The water-repellent layer forming step may, if necessary, include a pre-drying step which is located between the dipping step and the heat treatment step. In the pre-drying step, as shown in FIG. 7, the wire mesh material 10A is introduced into a dryer 165, heated by a heater 166, and dried. The drying temperature is set at or above the evaporation temperature of the water and below the thermal decomposition temperature of the surfactant. Thus, water in the fluorine resin solution 160 that is painted on the wire mesh material 10A is removed. The heater 166 is an infrared heater, for example.

The pre-drying step, as described above, is an independent step to remove the water in the fluorine resin solution 160 that is painted on the wire mesh material 10A. In the subsequent heat treatment step, since the removal of water is not required, it is possible to reduce the thermal load.

Now, a description of the embodiment is given.

Figure 8:
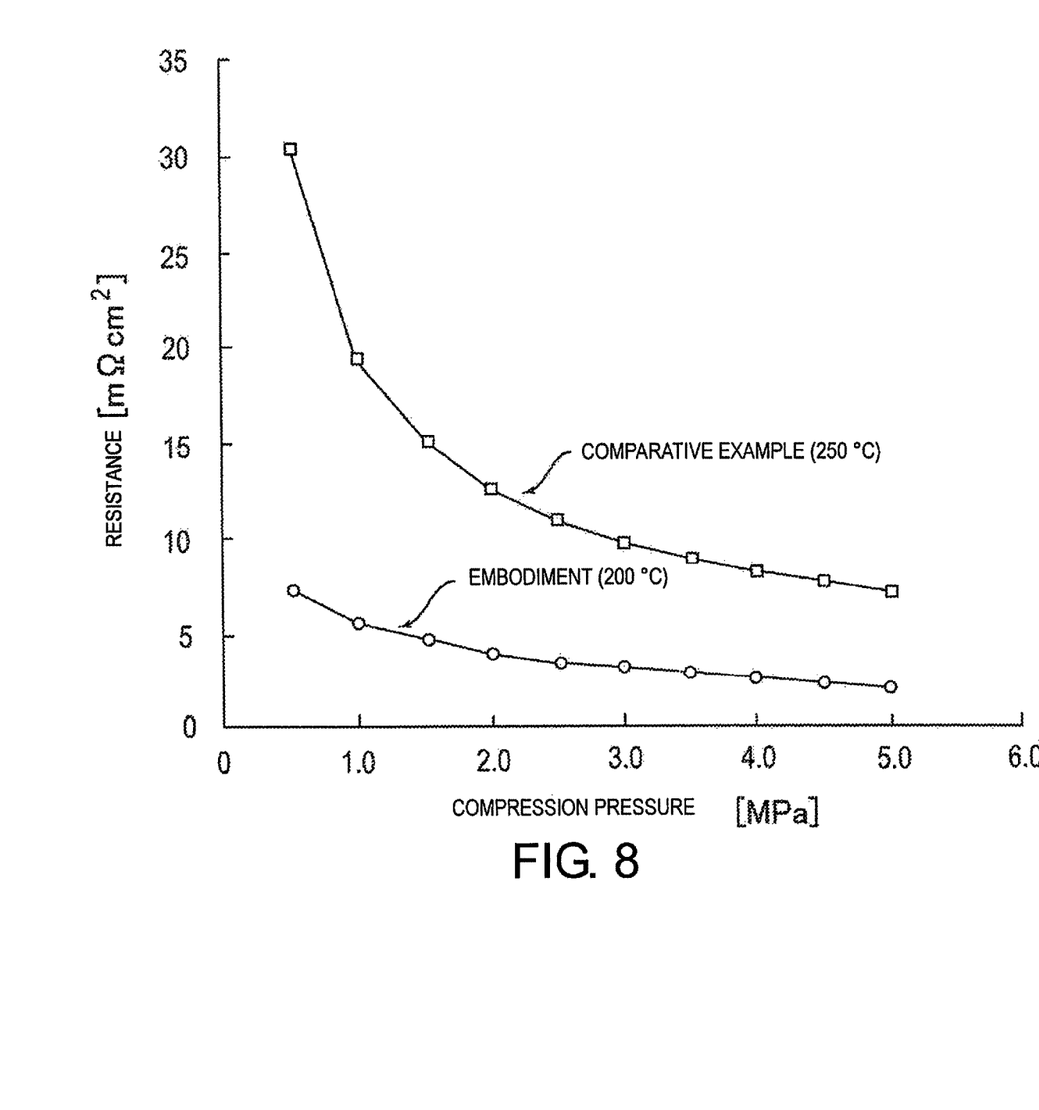
FIG. 8 is a graph for explaining the measurement results of electric resistance according to the embodiments and comparative examples.
Figure 9:
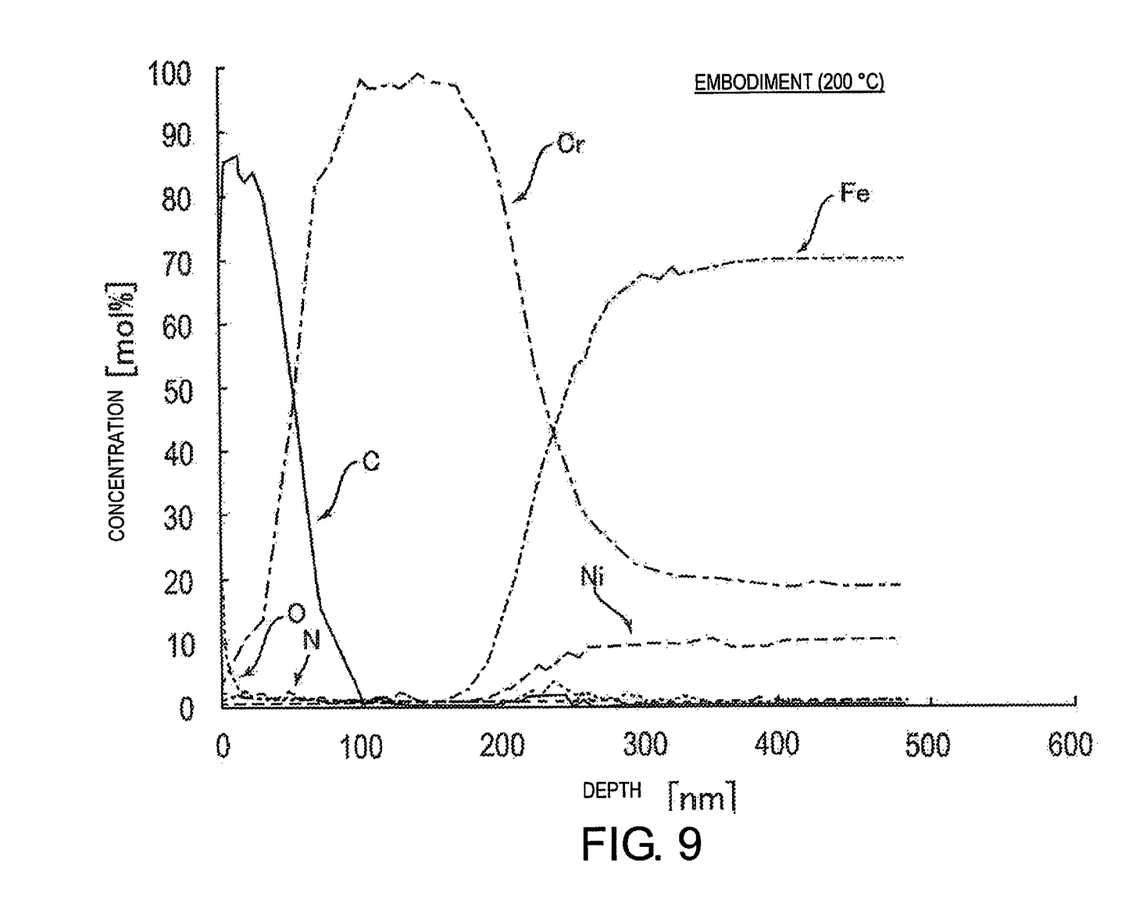
FIG. 9 is a graph for explaining the elemental analysis results of the embodiment in the direction of depth.
Figure 10:
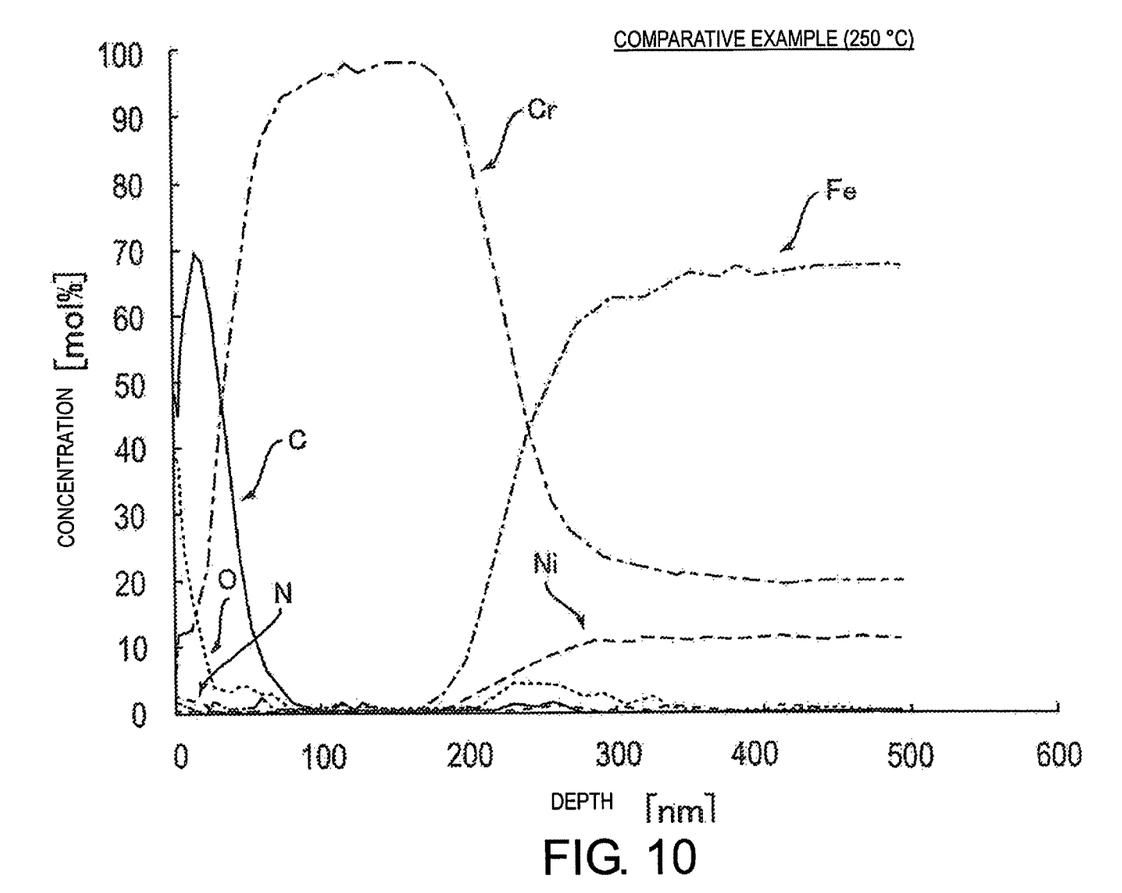
FIG. 10 is a graph for explaining the elemental analysis results of a comparative example.

FIG. 8 is a graph for explaining the measurement results of electric resistance according to the embodiments and comparative example. FIG. 9 is a graph for explaining the elemental analysis results of the embodiment in the direction of depth. Further, FIG. 10 is a graph for explaining the elemental analysis results of the comparative example. Note that the measurement of the electric resistance is pleasured in a state of adding a compression pressure.

In the embodiment, in the conductive layer forming step, a meshed wire is formed with a hard carbon film layer composed of diamond-like carbon, which assumes the intensity ratio R($I_D/I_G$) of 2. In the water-repellent forming step, a water-repellent layer is formed by applying coating of fluorine solution.

The fluorine resin solution a water-dispersed solution with 1.6 wt % FEP. As surfactant, poly (oxyethylene) alkyl ether is added. The dipping time of wire mesh to the fluorine resin solution lasts one minute. After being taken out of the fluorine resin solution, the fluorine resin solution excessively adhered to the mesh wire is removed. The drying temperature and drying time is 150° C. and 3 minutes, respectively. The heat treatment temperature and heat treatment time are 200° C. and 2 hours, respectively.

In the comparative Example, except that the heat treatment temperature is set at 250° C., the gas diffusion layer was prepared in substantially the same conditions as the embodiment.

As shown in FIG. 8, irrespective of the value of compressing pressure applied when measuring the electrical resistance, the electrical resistance of the Comparative example shows a value greater than the electric resistance of the embodiment. On the other hand, according to the results of the elemental analysis in the depth direction, in the Comparative Example (FIG. 10) when compared to the embodiment (FIG. 9), the oxygen (O) concentration of the surface increases while the carbon (C) concentration decreases, which indicates that an oxide layer is formed. This means that, at a relatively low temperature of 250° C., the structure of the conductive layer (hard carbon film layer made of diamond-like carbon) is destroyed so that the electric resistance is increased and the electron conductivity is deteriorated. Thus, in order to secure a desired electrical conductivity, it is preferable to increases. Therefore, in order to ensure the desired electrical conductivity, the heat treatment temperature is preferably set less than 250° C., and more preferably at or less than 200° C.

Figure 11:
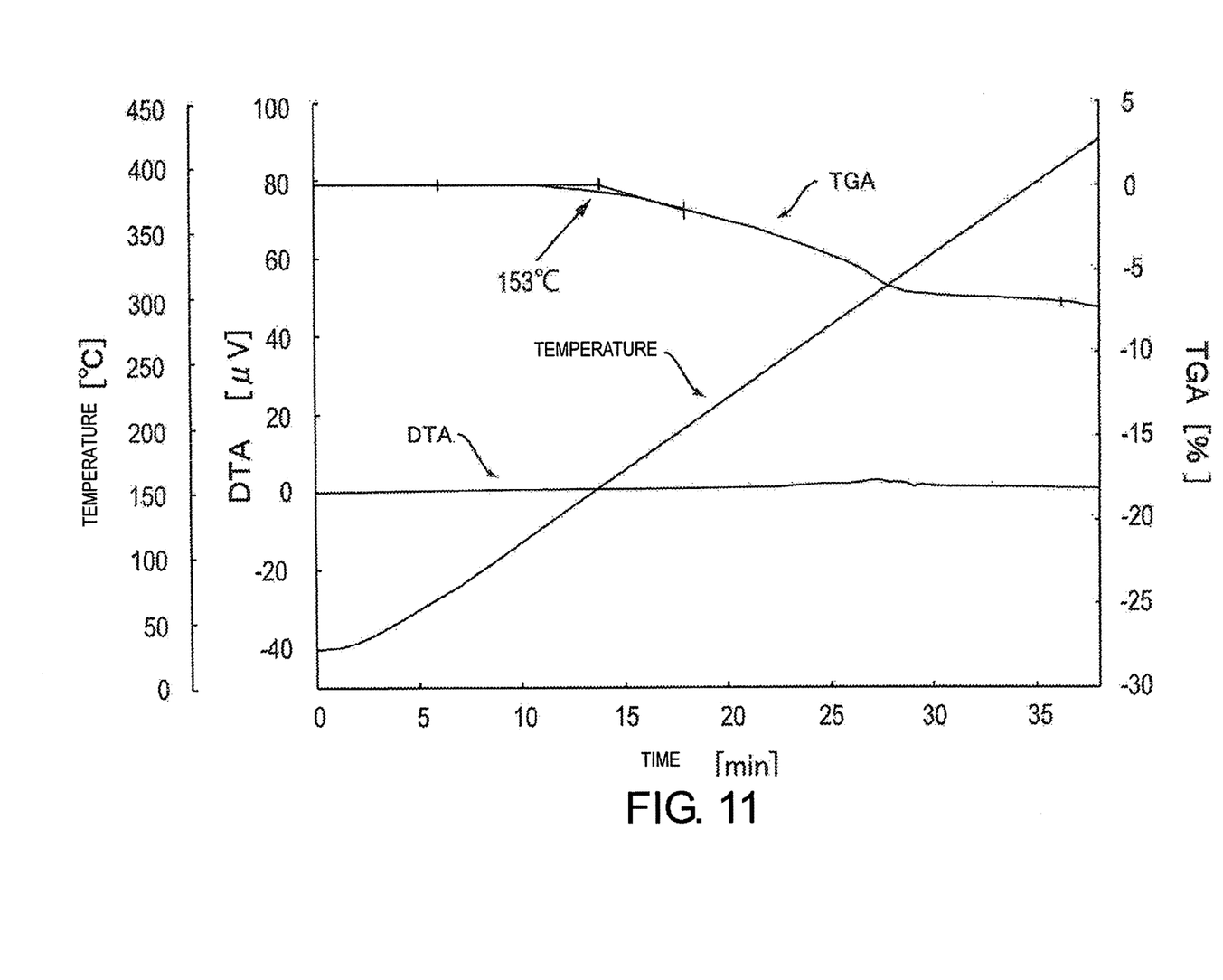
FIG. 11 is a graph for explaining the TGA and DTA measurement results of the surface active agent contained in the fluorine resin solution applied to the water-repellent layer forming step.

FIG. 11 is a graph for explaining the TGA (thermo gravimetric) of the surfactant contained in the fluorine resin solution applied to the water-repellent layer forming step and DTA (differential thermal gravimetric) measurement.

The specimen is prepared by dripping a fluorine resin solution drop on a glass substrate, and adjusted by removing water and dried at room temperature. The fluorine solution is water-dispersed solution with 1.6 wt % FEP. As a surfactant, poly (oxyethylene) alkyl ether is added.

As shown in FIG. 11, the weight decreases at 153° C. Thus, it was confirmed that the evaporation temperature is 153° C. Thus, by carrying out the pre-drying step at or above the water evaporation temperature (100° C.) and below the thermal decomposition temperature of the surfactant (153° C.), it is possible to cause only water to be evaporated. In addition, by performing heat treatment by at a temperature at or above the thermal decomposition temperature of the surfactant (153° C.) and below the destruction temperature (250° C.) of the conductive layer (hard carbon film layer), while maintaining good electron conductivity, it is possible to impart good water repellency by forming the water repellent layer.

Figure 12:
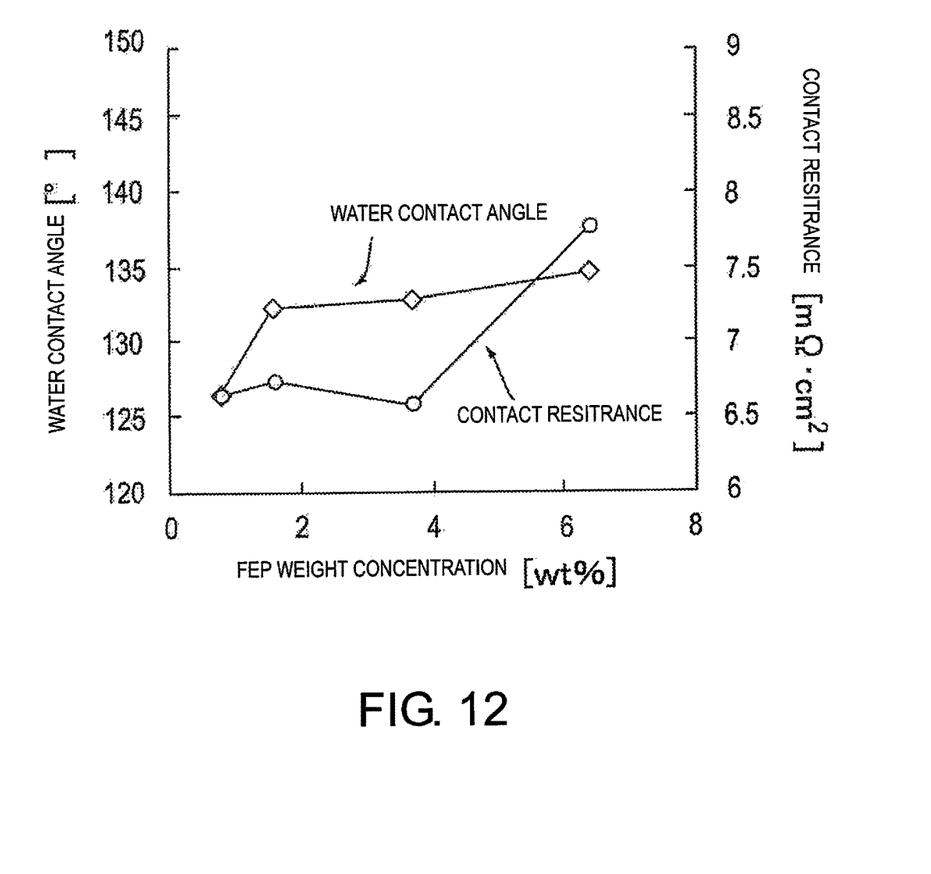
FIG. 12 is a graph showing the relationship between a water contact angles relative to the fluorine resin concentration of the fluorine resin solution and a contact resistance.

FIG. 12 is a graph showing a relationship between a water contact angle relative to the fluorine resin concentration of the fluorine resin solution and a contact resistance. Note that the fluoro resin is FEP.

As shown in FIG. 12, when the fluorine resin concentration is at 0.8 wt %, the water contact angle and contact resistance show 126.5° and 8.64 milliohms-cm$^2$, respectively. Further, when the fluorine resin concentration is 6.4 wt %, the water contact angle and contact resistance are 134.6° and 7.76 milliohms-cm$^2$, respectively. Thus, the resistance and drainage are compatible. Therefore, in order to form the water-repellent layer without increasing the resistance, it is preferable to keep the fluorine resin concentration in the range between 0.8 wt % and 6.4 wt %.

As described above, in the present embodiment, the conductive layer consists of a carbon coating layer, as compared to the conductive layer made of precious metal like gold and platinum, it is possible to manufacture the conductive layer inexpensively. In addition, since the heat treatment temperature is set less than destruction temperature of the conductive layer, the destruction of the conductive layer can be suppressed when forming the water-repellent layer. In other words, while maintaining good electron conductivity imparted by forming a conductive layer, it is possible to impart good water repellency, as well. Therefore, it is possible to provide a fuel cell metal gas diffusion layer of good electron conductivity and water-repellent at low cost and to provide a manufacturing method thereof.

In addition, it is preferable to apply a dip or immersion coating process as the water-repellent layer forming step because the structure and process are simple. In this case, by dipping the porous metal body to a fluorine resin solution, a fluorine resin solution is coated.

By including a surfactant in the fluorine resin solution, it is possible to use an aqueous dispersion solution as a fluorine solution. In this case, as compared to the case of using the organic solvent dispersion liquid, environmental cost is reduced.

Regarding the fluorine resin concentration, when the weight concentration in the aqueous dispersion solution is in the range from 0.8 wt % to 6.4 wt %, it is possible to ensure good water repellency while suppressing the adverse effect on the contact resistance. Therefore, it is possible to achieve both the conductivity and water repellency.

The fluorine resin is preferably FEP. In this case, since FEP has a relatively low melting point as the fluorine resin, it is possible to apply a relatively low temperature as the temperature of the heat treatment.

The conductive layer is preferably a hard carbon coating layer consisting of diamond-like carbon. It is further preferable that, in the hard carbon coating layer, the intensity ratio $R(I_D/I_G)$ is 1.3 or more, which represents a ratio of the D-band peak intensity to the G-band peak intensity when measured by Raman scattering spectroscopy. In this case, it is possible to ensure good electronic conductivity.

The metal porous body is preferably composed of a wire mesh formed by weaving a plurality of wires. In this case, since the wire mesh has good strength, it is easy to form the gas diffusion layer of small thickness.

The present invention is not intended to be limited to the embodiments described above, and can be variously modified in the scope of the appended claims. For example, a metal gas diffusion layer can utilize a pre-cut, plate-shaped metal net material formed into a predetermined shape and manufactured in a batch. As the metal porous body which is a base material of the metal gas diffusion layer, it is also possible to apply punching metal, expanded metal, etching metal.

The invention claimed is:

1. A method for manufacturing a metal gas diffusion layer made of a metal porous body disposed between a polymer electrolyte membrane and a separator for a fuel cell, the method comprising:
   forming a conductive layer of carbon film layer on the metal porous body; and
   forming a water-repellent layer on the metal porous body formed with the conductive layer,
   coating a solution containing a fluorine resin which constitutes the water-repellent layer and a volatile component which does not constitute the water-repellent layer on the metal porous body, and heat-treating the metal porous body coated with the solution at or above an evaporation temperature of 153 degrees Celsius of the volatile component that does not constitute the water-repellent layer contained in the solution and less than a destruction temperature of 250 degrees Celsius of the conductive layer to thereby form the water-repellent layer composed of the fluorine resin.

2. The method for manufacturing a metal gas diffusion layer for a fuel cell as claimed in claim 1, wherein the coating the solution on the metal porous body includes dipping the metal porous body in the solution.

3. The method for manufacturing a metal gas diffusion layer for a fuel cell as claimed in claim 2, wherein the solution contains a surfactant representing a thermal decomposition component which does not constitute the water-repellent layer, and is heat treated at and above a thermal decomposition temperature of the surfactant in the heat-treating.

4. The method for manufacturing a metal gas diffusion layer for a fuel cell as claimed in claim 3, wherein the solution is a water dispersion solution in which the fluorine resin, the surfactant, and water are mixed, and the volatile component is water.

5. The method for manufacturing a metal gas diffusion layer for a fuel cell as claimed in claim 4, wherein a concentration of the fluorine resin is, by weight concentration in the water dispersion solution, in the range between 0.8 wt % and 6.4 wt %.

6. The method for manufacturing a metal gas diffusion layer for a fuel cell as claimed in claim 4, wherein the fluorine resin is tetrafluoroethylene-hexafluoropropylene copolymer (FEP).

7. The method for manufacturing a metal gas diffusion layer for a fuel cell as claimed in claim 1, wherein the conductive layer is a hard carbon coating layer made of diamond-like carbon, and an intensify ratio $R$ $(I_D/I_G)$ which represents a ratio R of the D-band peak intensity $I_D$ to the G-band peak intensity $I_G$ measured by, the Raman scattering spectroscopy is at or above 1.3.

8. The method for manufacturing a metal gas diffusion layer for a fuel cell as claimed in claim 5, wherein the fluorine resin is tetrafluoroethylene-hexafluoropropylene copolymer (FEP).

9. The method for manufacturing a metal gas diffusion layer for a fuel cell as claimed in claim 2, wherein the conductive layer is a hard carbon coating layer made of diamond-like carbon, and an intensify ratio $R$ $(I_D/I_G)$ which represents a ratio R of the D-band peak intensity $I_D$ to the G-band peak intensity $I_G$ measured by the Raman scattering spectroscopy is at or above 1.3.

10. The method for manufacturing a metal gas diffusion layer for a fuel cell as claimed in claim 3, wherein the conductive layer is a hard carbon coating layer made of diamond-like carbon, and an intensify ratio $R$ $(I_D/I_G)$ which represents a ratio R of the D-band peak intensity $I_D$ to the G-band peak intensity $I_G$ measured by the Raman scattering spectroscopy is at or above 1.3.

11. The method for manufacturing a metal gas diffusion layer for a fuel cell as claimed in claim 4, wherein the conductive layer is a hard carbon coating layer made of diamond-like carbon, and an intensify ratio $R$ $(I_D/I_G)$ which represents a ratio R of the D-band peak intensity $I_D$ to the G-band peak intensity $I_G$ measured by the Raman scattering spectroscopy is at or above 1.3.

12. The method for manufacturing a metal gas diffusion layer for a fuel cell as claimed in claim 5, wherein the conductive layer is a hard carbon coating layer made of diamond-like carbon, and an intensify ratio R ($I_D/I_G$) which represents a ratio R of the D-band peak intensity $I_D$ to the G-band peak intensity $I_G$ measured by the Raman scattering spectroscopy is at or above 1.3.

13. The method for manufacturing a metal gas diffusion layer for a fuel cell as claimed in claim 6, wherein the conductive layer is a hard carbon coating layer made of diamond-like carbon, and an intensify ratio R ($I_D/I_G$) which represents a ratio R of the D-band peak intensity $I_D$ to the G-band peak intensity $I_G$ measured by the Raman scattering spectroscopy is at or above 1.3.

* * * * *